US008812584B2

(12) United States Patent
Tsubaki

(10) Patent No.: US 8,812,584 B2
(45) Date of Patent: Aug. 19, 2014

(54) MOVING PICTURE FILE TRANSMITTING SERVER AND METHOD OF CONTROLLING OPERATION OF SAME

(75) Inventor: Hisayoshi Tsubaki, Tokyo (JP)

(73) Assignee: Facebook, Inc., Menlo Park, CA (US)

( * ) Notice: Subject to any disclaimer, the term of this patent is extended or adjusted under 35 U.S.C. 154(b) by 1280 days.

(21) Appl. No.: 12/556,789

(22) Filed: Sep. 10, 2009

(65) Prior Publication Data
US 2010/0082740 A1 Apr. 1, 2010

(30) Foreign Application Priority Data

Sep. 29, 2008 (JP) ................................. 2008-249819

(51) Int. Cl.
G06F 15/16 (2006.01)
(52) U.S. Cl.
USPC .......................................................... 709/203
(58) Field of Classification Search
None
See application file for complete search history.

(56) References Cited

U.S. PATENT DOCUMENTS

| 7,796,999 | B1 * | 9/2010 | Martin et al. | 455/456.1 |
|---|---|---|---|---|
| 2001/0010685 | A1 * | 8/2001 | Aho | 370/329 |
| 2002/0105951 | A1 * | 8/2002 | Hannuksela et al. | 370/389 |
| 2005/0259690 | A1 * | 11/2005 | Garudadri et al. | 370/477 |
| 2007/0147330 | A1 * | 6/2007 | Smith et al. | 370/346 |
| 2007/0201500 | A1 * | 8/2007 | Deshpande | 370/412 |
| 2008/0159639 | A1 * | 7/2008 | Dvir et al. | 382/236 |
| 2008/0304810 | A1 * | 12/2008 | Rijckaert et al. | 386/68 |
| 2009/0013039 | A1 * | 1/2009 | Peng et al. | 709/203 |
| 2009/0147734 | A1 * | 6/2009 | Naka et al. | 370/329 |
| 2010/0278542 | A1 * | 11/2010 | Dalton | 398/210 |
| 2011/0231819 | A1 * | 9/2011 | Tanner et al. | 717/123 |

FOREIGN PATENT DOCUMENTS

| JP | 9-298749 A | 11/1997 |
|---|---|---|
| JP | 2002-82861 A | 3/2002 |
| JP | 2004-88500 A | 3/2004 |
| JP | 2004-222124 A | 8/2004 |
| JP | 2006-343830 A | 12/2006 |

* cited by examiner

Primary Examiner — Joseph E Avellino
Assistant Examiner — James Baron
(74) Attorney, Agent, or Firm — Sheppard Mullin Richter & Hampton LLP

(57) ABSTRACT

A moving picture suitable for display on a mobile telephone is displayed comparatively quickly. When a moving picture is requested, a leading segment of the moving picture is converted. The leading segment has an amount of data which, after the conversion, is less than the amount of data that is displayable on the mobile telephone that issued the request. A succeeding segment, which can be converted while the leading segment is being transmitted to the mobile telephone and viewed by the user of the mobile telephone, is converted. If there is a request for the succeeding segment after the leading segment is viewed, the conversion of the succeeding segment will be finished by the time of the request for succeeding segment. As a result, the succeeding segment can be transmitted to the mobile telephone quickly, and it can be viewed rapidly.

13 Claims, 10 Drawing Sheets

*Fig. 2*

TERMINAL SPECIFICATIONS TABLE

| MOBILE TELEPHONE CARRIER | MOBILE TELEPHONE MODEL | DISPLAY SPECIFICATIONS (FORMAT, NUMBER OF BITS, BIT RATE, FRAME RATE, AMOUNT OF DATA) |
|---|---|---|
| MOBILE TELEPHONE COMPANY A | a1 | 3GPP2, QVGA, 128kbps, 64kbps, 15fps, 1Mbyte (VIDEO) (AUDIO) |
| | a2 | — — — — — |
| | a3 | — — — — — |
| | : | : |
| | an | — — — — — |
| MOBILE TELEPHONE COMPANY B | b1 | — — — — — |
| | b2 | — — — — — |
| | b3 | — — — — — |
| | : | : |
| | bn | — — — — — |
| MOBILE TELEPHONE COMPANY C | c1 | — — — — — |
| | c2 | — — — — — |
| | c3 | — — — — — |
| | : | : |
| | cn | — — — — — |

MOVING PICTURE FILE TRANSMITTING SERVER AND METHOD OF CONTROLLING OPERATION OF SAME

BACKGROUND OF THE INVENTION

1. Field of the Invention

This invention relates to a server for transmitting moving picture files and to a method of controlling operation of the server.

2. Description of the Related Art

A moving picture transmitting service for a client terminal typified by a mobile telephone has been announced. In the transmission of moving pictures oriented toward mobile telephones, the MPEG4 (Moving Picture Experts Group Phase 4) format is employed for video and the AAC (Advanced Audio Coding) format and AMR (Adaptive Multi-Rate CODEC), etc., are employed for audio. Further, a plurality of formats such as 3GPP (3$^{rd}$ Generation Partnership Project) and 3GPP2, etc., are employed as multiplexed file formats. In addition, there are also instances where a format unique to the mobile telephone carrier is utilized.

It is required that the client terminal to which a transmission is to be made be sent a moving picture file having a format, etc., that is displayable on the client terminal. Since moving picture files have a number of forms and formats, generating the moving picture files beforehand for every model of client terminal requires the preparation of a very large number of types of moving picture files. Generating beforehand a moving picture file that is suitable for display on a client terminal means that a large memory area is required in order to store the moving picture file. Further, generating a moving picture file suitable for display on a client terminal in response to a request from this client terminal necessitates considerable time before the moving picture file can be transmitted to the client terminal.

A number of proposals have been made to deal with these issues. According to Japanese Patent Application Laid-Open No. 9-298749, a moving picture for transmission is expanded up to an intermediate state, the network load is sensed and the moving picture for transmission is generated upon deciding the amount of coding of the moving picture. According to Japanese Patent Application Laid-Open No. 2002-82861, the image compression format, image size and quality are decided by user designation and then the transmission to the user is made. According to Japanese Patent Application Laid-Open No. 2004-88500, moving picture formats of a plurality of types are supported and a moving picture is converted to the format that conforms to the scheme of the transmitting means at the destination of the transmission. According to Japanese Patent Application Laid-Open No. 2004-222124, the model of a client terminal is discriminated, moving-picture generation parameters conforming to the model are decided and a moving picture for transmission is generated. According to Japanese Patent Application Laid-Open No. 2006-343830, a format conversion is made in accordance with attribute data of a client terminal and the picture is then transmitted to the client terminal.

Nevertheless, the time it takes to transmit a moving picture file to a client terminal cannot be shortened while at the same time keeping as small as possible the memory area in which the moving picture file is stored.

SUMMARY OF THE INVENTION

An object of the present invention is to shorten the time it takes to transmit a moving picture file to a client terminal while keeping as small as possible the memory area in which the moving picture file is stored.

According to the present invention, the foregoing object is attained by providing a moving picture file transmitting server comprising: a moving picture file request receiving device (moving picture file request receiving means) for receiving a moving picture file request transmitted from a client terminal; a leading segment converting device (leading segment converting means) for converting file format, number of pixels per frame, bit rate, frame rate and amount of data of a leading segment of a moving picture file, which segment represents the leading segment of the moving picture specified by the moving picture file request, in such a manner that the leading segment can be reproduced by the client terminal that transmitted the moving picture file request and such that reproduction time thereof will be less than the time in which the moving picture file can be reproduced by the client terminal; a first transmitting device (first transmitting means) for transmitting the leading segment, which has been converted by the leading segment converting device, to the client terminal that transmitted the moving picture file request; a succeeding segment converting device (succeeding segment converting means) for converting file format, number of pixels per frame, bit rate, frame rate and amount of data of a succeeding segment, which has a reproduction time less than that of the leading segment, during transmission of the leading segment by the first transmitting device, the succeeding segment being a segment that follows the leading segment transmitted by the first transmitting device; a succeeding segment request receiving device (succeeding segment request receiving means) for receiving a request for the succeeding segment transmitted from the client terminal; and a second transmitting device (second transmitting means), responsive to receipt of the succeeding segment request, for transmitting the succeeding segment, which has been converted by the succeeding segment converting device, to the client terminal that transmitted the succeeding segment request.

The present invention also provides an operation control method suited to the above-described moving picture file transmitting server. Specifically, the method comprises the steps of: receiving a moving picture file request transmitted from a client terminal; converting file format, number of pixels per frame, bit rate, frame rate and amount of data of a leading segment of a moving picture file, which segment represents the leading segment of the moving picture specified by the moving picture file request, in such a manner that the leading segment can be reproduced by the client terminal that transmitted the moving picture file request and such that reproduction time thereof will be less than the time in which the moving picture file can be reproduced by the client terminal; transmitting the converted leading segment to the client terminal that transmitted the moving picture file request; converting file format, number of pixels per frame, bit rate, frame rate and amount of data of a succeeding segment, which has a reproduction time less than that of the leading segment, during transmission of the leading segment, the succeeding segment being a segment that follows the leading segment that has been transmitted; receiving a request for the succeeding segment transmitted from the client terminal; and responsive to receipt of the succeeding segment request, transmitting the converted succeeding segment to the client terminal that transmitted the succeeding segment request.

In accordance with the present invention, when a moving picture file request transmitted from a client terminal is received, the file format, number of pixels per frame, bit rate, frame rate and amount of data of a leading segment of the moving picture file, which segment represents the leading segment of the moving picture specified by the moving picture file request, are converted in such a manner that the leading segment can be reproduced by this client terminal and such that reproduction time of the leading segment will be less than the time in which the moving picture file can be reproduced by the client terminal. The leading segment obtained by the conversion is transmitted to the client terminal. Since the leading segment has a reproduction time less than the time in which the moving picture file can be reproduced by the client terminal, the time needed to convert the leading segment becomes comparatively short. Since the time from the moving picture file request until the transmission of the leading segment to the client terminal becomes comparatively short, user waiting time at the client terminal is shortened. Since the leading segment is not converted and stored beforehand, memory area for storage in advance is unnecessary. A succeeding segment is converted during the transmission of the leading segment. If a request for a succeeding segment is received, therefore, the converted succeeding segment can be transmitted to the client terminal immediately.

The server may further comprise a conversion control device (conversion control means) for controlling the succeeding segment converting device in such a manner that the conversion by the succeeding segment converting device is repeated.

In response to receipt of a succeeding segment request at the succeeding segment receiving device in a case where conversion of a succeeding segment in the succeeding segment converting device has not ended, a completed portion of the succeeding segment (an intermediate portion) in the succeeding segment converting device is transmitted to the client terminal that transmitting the succeeding segment request.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 illustrates an example of a terminal specifications table;

DESCRIPTION OF THE PREFERRED EMBODIMENTS

Preferred embodiments of the present invention will now be described in detail with reference to the drawings.

Figure 1:
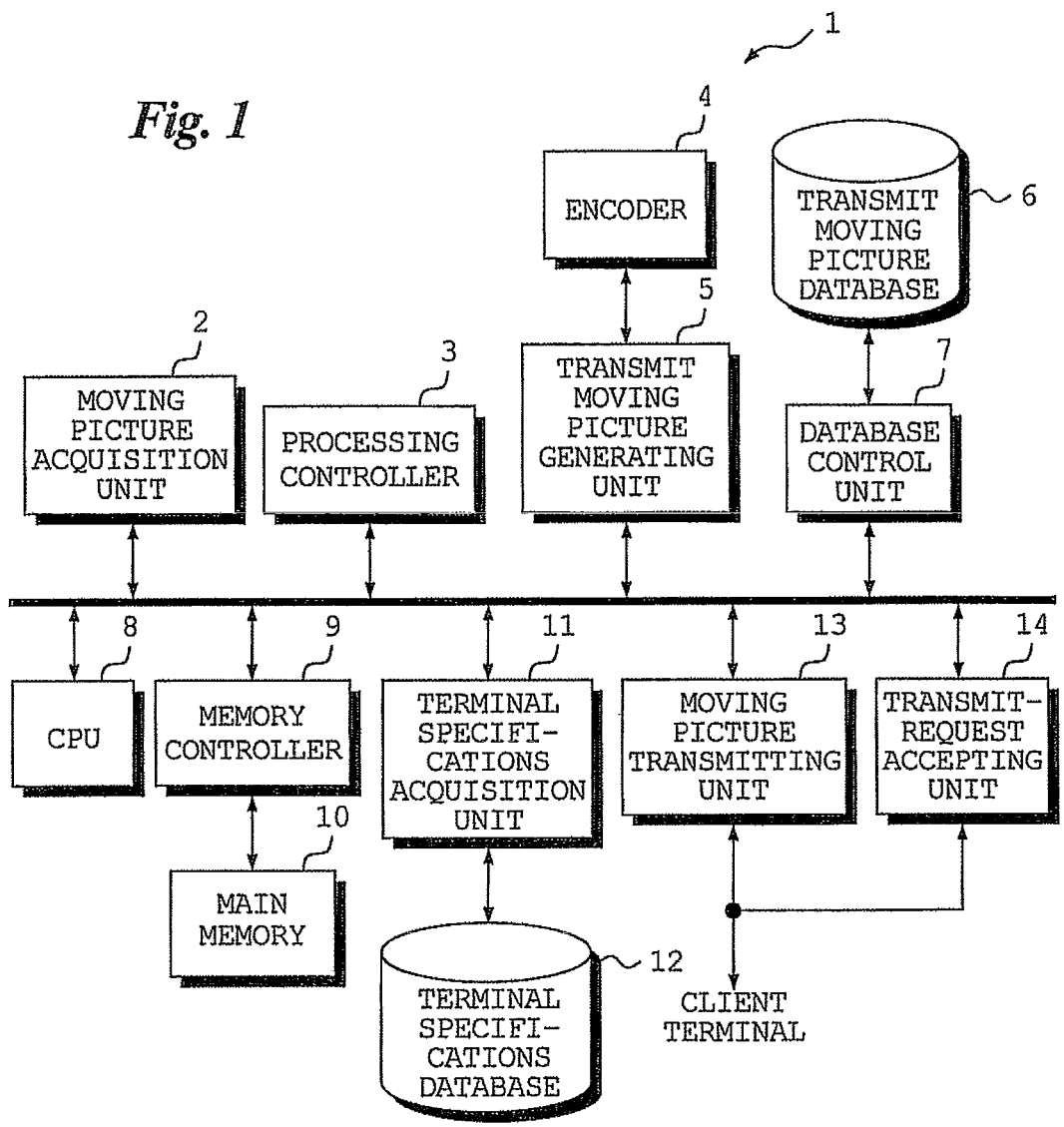
FIG. 1 is a block diagram illustrating the electrical configuration of an image transmitting server.

FIG. 1 is a block diagram illustrating the electrical configuration of an image transmitting server 1 according to a first embodiment of the present invention.

The image transmitting server 1 transmits a moving picture file to a client terminal in response to a request from the client terminal. In particular, in this embodiment, if there is a moving picture file request from the client terminal, the file format, number of pixels per frame, bit rate, frame rate and amount of data of a leading segment of a moving picture file, which segment represents the leading segment of the moving picture specified by the moving picture file request, are converted in such a manner that the leading segment can be reproduced by the client terminal and such that reproduction time of the leading segment will be less than the time in which the moving picture file can be reproduced by the client terminal. Since the leading segment has a display time shorter than the time in which the moving picture file can be displayed by the client terminal, the time needed to convert the leading segment becomes comparatively short. Since the time from the moving picture file request until the transmission of the leading segment to the client terminal becomes comparatively short, user waiting time at the client terminal is shortened. The user of the client terminal can view the requested moving picture comparatively soon.

The overall processing executed by the image transmitting server 1 is controlled by a CPU 8.

The image transmitting server 1 includes a moving picture acquisition unit 2 for acquiring a moving picture file. The moving picture file acquired by the moving picture acquisition unit 2 is stored in a transmit moving picture database 6 by a database control unit 7. The image transmitting server 1 includes a processing controller 3 in which processing such as processing for deciding a leading segment is executed; a encoder 4 for encoding a moving picture file; and a transmit moving picture generating unit 5 for generating a transmit moving picture.

The image transmitting server 1 further includes a main memory 10 for storing prescribed data; a memory controller 9 for controlling the main memory 10; a terminal specifications database 12 in which data indicating the specifications of client terminals has been stored; a terminal specifications acquisition unit 11 for acquiring data that has been stored in the terminal specifications database 12; a moving picture transmitting unit 13 for transmitting a moving picture file to a client terminal; and a transmit-request accepting unit 14 for accepting a request transmitted from a client terminal.

Although it is assumed in this embodiment that a client terminal is a mobile telephone, it goes without saying that other terminal devices can be utilized.

FIG. 2 is an example of a terminal specifications table that has been stored in the terminal specifications database 12.

Display specifications suitable for reproducing a moving picture on respective mobile telephones have been defined in the terminal specifications table for every mobile telephone carrier (mobile telephone company) and every model of mobile telephone. The display specifications include the format of a moving picture file, the number of pixels (horizontally and vertically) of an image constituting one frame, the bit rate, the frame rate and the amount of data receivable. In response to a request for a moving picture file from a client terminal to the image transmitting server 1, the carrier and the model of the client terminal that issued the request are discriminated. The display specifications corresponding to the model discriminated are read from the terminal specifications table stored in the terminal specifications database 12. The moving picture file is converted in accordance with the display specifications that have been read, whereby a moving picture file suitable for display on the client terminal that issued the request is obtained.

Figure 3:
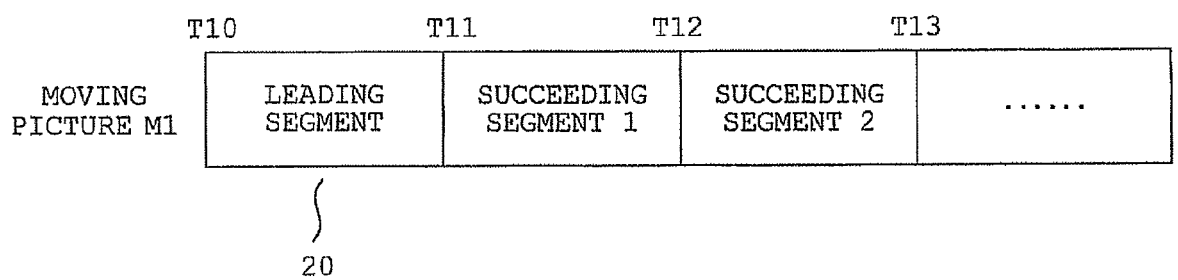
FIG. 3 illustrates an example of a moving picture according to first embodiment of the present invention.

FIG. 3 is an example of a moving picture M1 represented by a moving picture file.

According to this embodiment, when a request for the moving picture M1 is transmitted, a leading segment 20 is decided. As mentioned above, the leading segment 20 is one portion of the moving picture file representing the moving picture M1 and is such that the amount of data of this segment after conversion can be reproduced (displayed and received) by a mobile telephone. When the request for the moving picture is transmitted, the leading segment 20 that has been decided is subjected to conversion processing conforming to the display specifications of the mobile telephone in such a manner that the moving picture M1 can be reproduced by the mobile telephone. During the time that the leading segment is being transmitted from the image transmitting server 1 to the client terminal and is being reproduced by the mobile telephone, the remaining portion of the moving picture file (succeeding segments 21, 22) is converted in accordance with the display specifications of the mobile telephone. If the moving picture M1 starts from time T0, the leading segment 20 will occupy time from T10 to T11, and the succeeding segments 21, 22 will occupy times from T11 to T12 and from T12 to T13, respectively.

Figure 4:
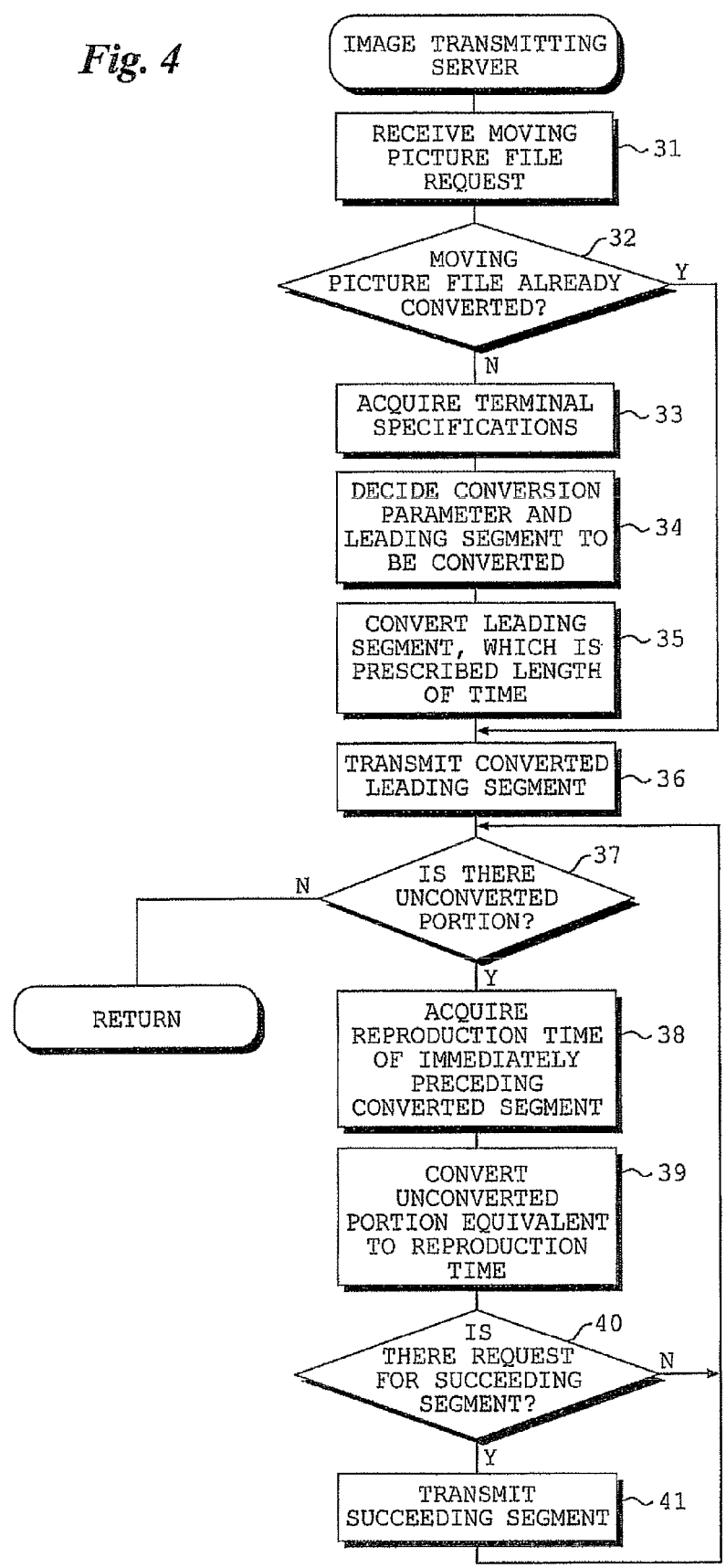
FIG. 4 is a flowchart illustrating processing executed by the image transmitting server according to the first embodiment.

FIG. 4 is a flowchart illustrating processing executed by the image transmitting server.

When a moving picture file request transmitted from a mobile telephone is received by the image transmitting server 1 (step 31), it is determined whether the requested moving picture file has already been converted so as to be reproducible on the mobile telephone that transmitted the moving picture file request (step 32). If the file has already been converted ("YES" at step 32), this means that the converted moving picture file has been stored in the transmit moving picture database 6 in correspondence with the model of the mobile telephone. Accordingly, it will suffice to determine whether a moving picture file that has already been converted has been stored in the transmit moving picture database 6.

If the requested moving picture file has not been converted so as to be reproducible on the mobile telephone that transmitted the request ("NO" at step 32), then the terminal specifications of the mobile telephone that transmitted the moving picture file request are acquired (step 33). Since the terminal specifications of the mobile telephone are included in the user agent of the moving picture file request, the specifications can be acquired from the user agent.

A conversion parameter (reproduction time T10 to T11 of the leading segment) and leading segment are decided using the terminal specifications acquired (step 34). Conversion processing is executed in such a manner that the leading segment of the prescribed length of time decided can be displayed on the mobile telephone that transmitted the moving picture file request (step 35). The leading segment thus converted is stored, together with the reproduction time T10 to T11 of this leading segment, in the transmit moving picture database 6 in correspondence with model of the mobile telephone.

The converted leading segment is transmitted to the mobile telephone that transmitted the moving picture file request (step 36). When the leading segment is received by the mobile telephone, the portion of the moving picture represented by this leading segment is reproduced at the mobile telephone and the user of the mobile telephone can view the reproduced portion.

If the remaining portion of the moving picture not transmitted to the mobile telephone has an unconverted portion ("YES" at step 37), then the reproduction time (T10 to T11) of the portion of the moving picture converted immediately previously (the converted leading segment 20 in this case) is acquired from the transmit moving picture database 6 (step 38). The remaining portion that can be converted during the time that the converted portion of the moving picture is reproduced is converted (step 39). For example, since the reproduction time of the leading segment 20 is the length of time from time T10 to time T11, as shown in FIG. 3, the succeeding segment 21 capable of being converted in the period of time (T10 to T11) is converted.

If there is a request for the succeeding segment ("YES" at step 40), then the succeeding segment that has been converted is transmitted from the image transmitting server 1 to the mobile telephone (step 41). If the converted succeeding segment is transmitted to the mobile telephone or if there is no request for the succeeding segment ("NO" at step 40), then the conversion processing is repeated until there is no longer any unconverted portion of the moving picture left.

As illustrated in FIG. 3, the succeeding segment 21 is converted while the leading segment 20 is being reproduced by the mobile telephone. While the converted succeeding segment 21 is being transmitted to and reproduced by the mobile telephone, the succeeding segment 22 that follows is converted. Since the leading segment is comparatively short and the amount of data thereof is less than the amount of data that can be received by the mobile telephone, the conversion processing ends in a comparatively short period of time. This means that time spent waiting for the leading segment is shortened. In addition, since a succeeding segment is converted during the reproduction of the leading segment, the succeeding segment that has been converted can be transmitted immediately if there is request for the succeeding segment.

Figure 5:
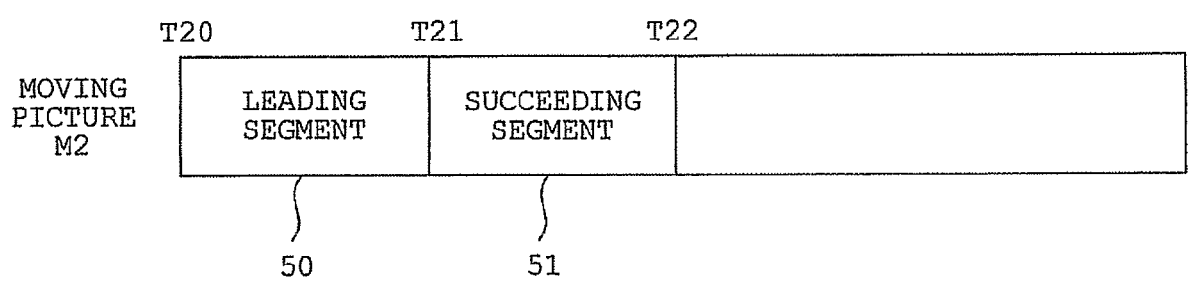
FIG. 5 illustrates an example of a moving picture according to a second embodiment of the present invention.
Figure 6:
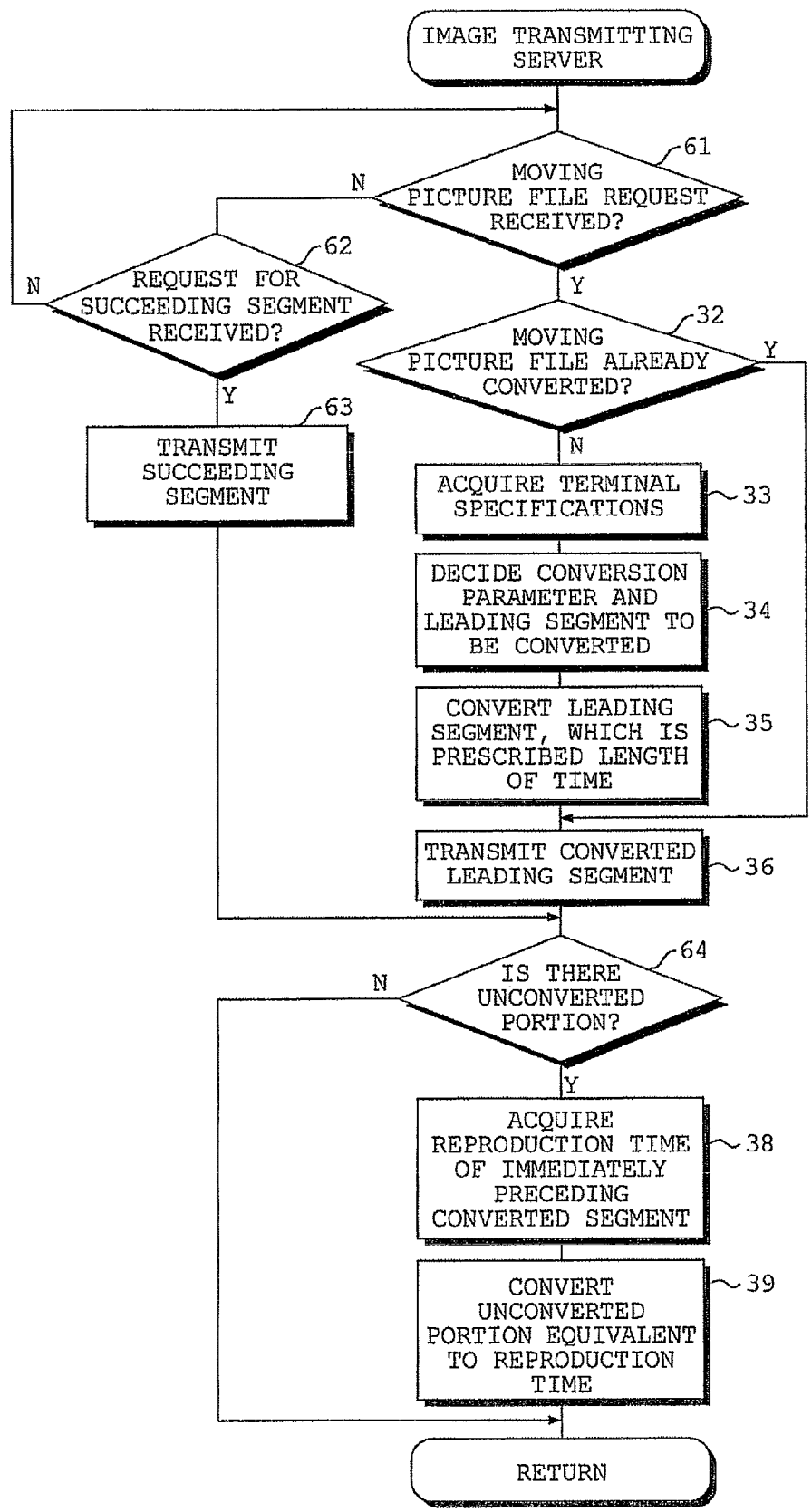
FIG. 6 is a flowchart illustrating processing executed by the image transmitting server according to the second embodiment.

FIGS. 5 and 6 illustrate a second embodiment of the present invention.

In the embodiment shown in FIGS. 3 and 4, a plurality of succeeding segments are generated one after another if there is a request for a moving picture file. In the embodiment shown in FIGS. 5 and 6, however, only a succeeding segment that directly follows a transmitted portion is generated.

FIG. 5 is an example of a moving picture M2 represented by a moving picture file.

When there is a request for the moving picture M2, a leading segment 50 from time T20 to time T21 is converted. While the converted leading segment 50 is being transmitted to the mobile telephone and viewed by the user of the mobile telephone, a succeeding segment 51 that follows the leading segment 50 is converted. If a request for the succeeding segment 51 has not been received when the conversion of the succeeding segment 51 ends, any further conversion of a succeeding segment beyond the succeeding segment 51 is not carried out. If a request for a further succeeding segment is received, a succeeding segment that follows the succeeding segment 51 is converted.

FIG. 6 is a flowchart illustrating processing executed by the image transmitting server 1 according to this embodiment. Processing steps in FIG. 6 identical with those shown in FIG. 4 are designated by like processing steps and need not be described again.

First, when a request for a moving picture file is received ("YES" at step 61), processing from steps 32 to 36 is executed in the manner set forth above. As a result, processing for converting the leading segment and for transmitting the leading segment is executed. If there is an unconverted portion, then a succeeding segment capable of being converted in the reproduction time of the immediately preceding converted portion is converted. (steps 38, 39). When conversion of the immediately following succeeding segment ends, the processing shown in FIG. 6 ends.

If a request for a succeeding segment is received ("NO" at step 61, "YES" at step 62), then the succeeding segment that has already been generated is transmitted to the mobile telephone (step 63). If there is an unconverted portion ("YES" at step 64), then a succeeding segment capable of being converted in the reproduction time of the succeeding segment that has been transmitted is converted (steps 38, 39).

Figure 7:
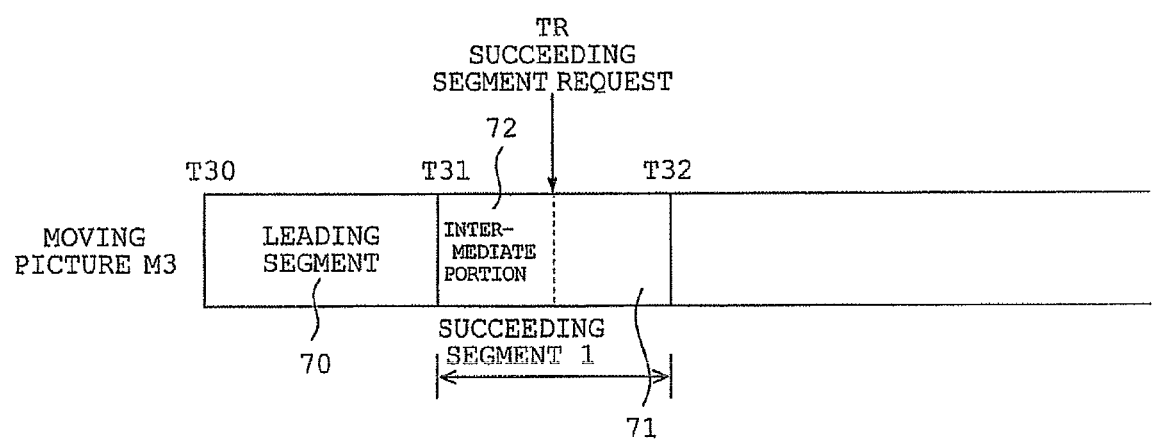
FIG. 7 illustrates an example of a moving picture according to a third embodiment of the present invention.
Figure 8:
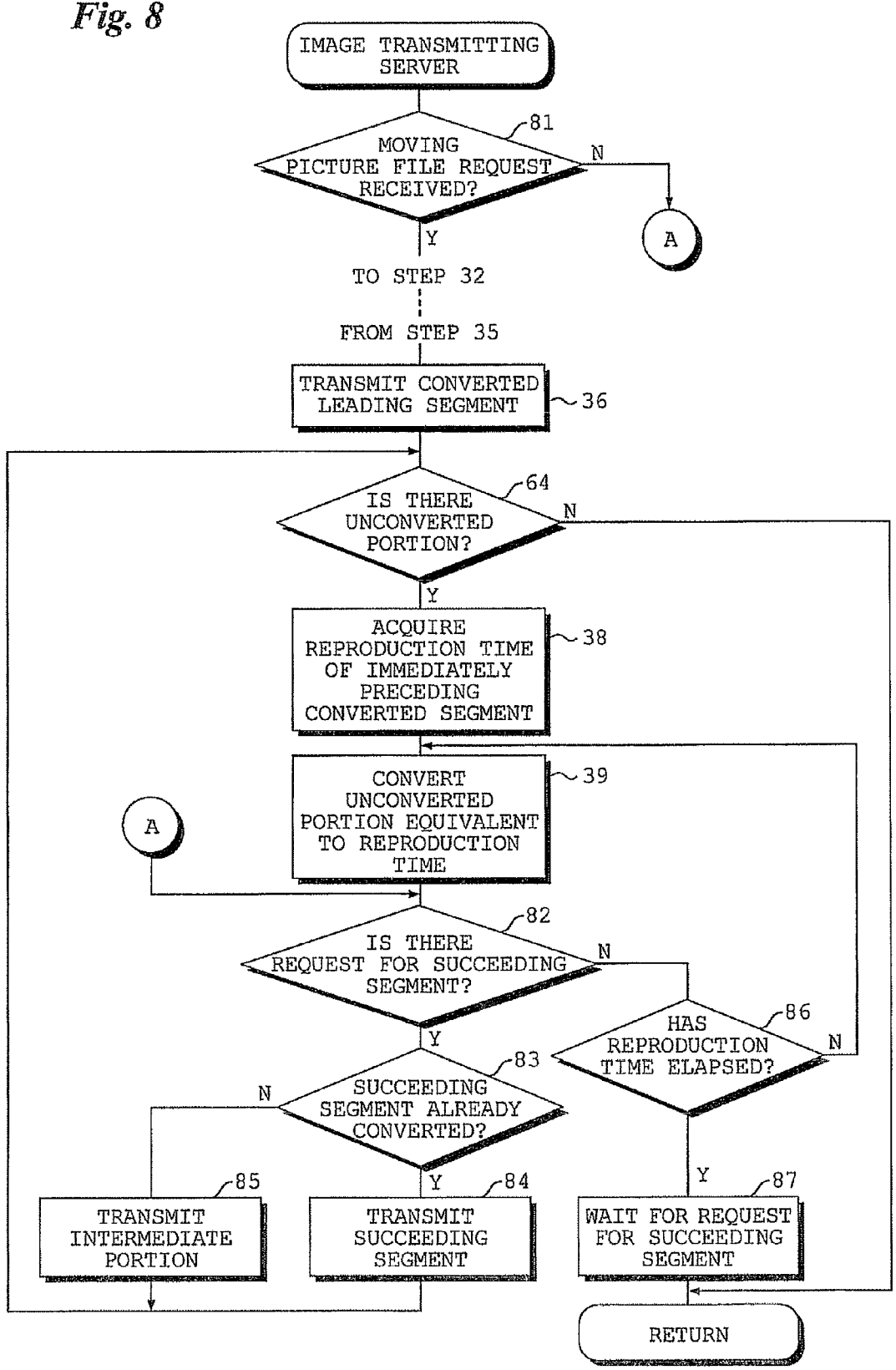
FIG. 8 is a flowchart illustrating processing executed by the image transmitting server according to the third embodiment.

FIGS. 7 and 8 illustrate a third embodiment of the present invention.

The embodiment illustrated in FIGS. 7 and 8 is such that in a case where there is a request for a succeeding segment even while conversion of the succeeding segment is in progress, the portion converted thus far (the portion of the segment whose conversion was in progress) is transmitted to the mobile telephone.

With reference to FIG. 7, a leading segment 70 from time T30 to T31 in a moving picture M3 is converted. A segment 71 succeeding the leading segment 70 is converted during the reproduction of the leading segment 70 that has been converted. The succeeding segment 71 has an amount of data the conversion of which ends during the reproduction time of the leading segment 70. If the user of the mobile telephone views the entirety of the leading segment 70, therefore, a succeeding segment request for requesting the succeeding segment 71 will not be transmitted to the image transmitting server 1 until the user finishes viewing the leading segment 70. However, if the user of the mobile telephone transmits a succeeding segment request without viewing the entirety of the leading segment 70, the succeeding segment request will be received at the image transmitting server 1 before the conversion of the succeeding segment 71 from time T31 to time T32 ends. For example, if there is a succeeding segment request at time TR, the succeeding segment request is received by the image transmitting server 1 before the conversion of the succeeding segment 71 ends. In this embodiment, the portion up to time TR at which the succeeding segment request is received (namely an intermediate portion 72) is transmitted to the mobile telephone.

FIG. 8 is a flowchart illustrating processing executed by the image transmitting server. Processing steps in FIG. 8 identical with those shown in FIG. 4 or FIG. 6 are designated by like processing steps and need not be described again.

When a moving picture file request is received ("YES" at step 81), the leading segment is converted and transmitted in the manner described above.

If, when there is a request for a succeeding segment ("YES" at step 82), the conversion of the succeeding segment has ended ("YES" at step 83), then the succeeding segment that has been converted is transmitted to the mobile telephone that transmitted the succeeding segment request (step 84). If there is a request for a succeeding segment while conversion of the succeeding segment is in progress ("NO" at step 83), then the intermediate portion, namely the portion of the segment that has been converted thus far, is transmitted to the mobile telephone that transmitted by succeeding segment request (step 85).

If there is no succeeding segment request ("NO" at step 82), a request for a succeeding segment is awaited upon elapse of reproduction time (step 87). If reproduction time has not elapsed ("NO" at step 86), then processing for converting the unconverted portion is continued.

Figure 9:
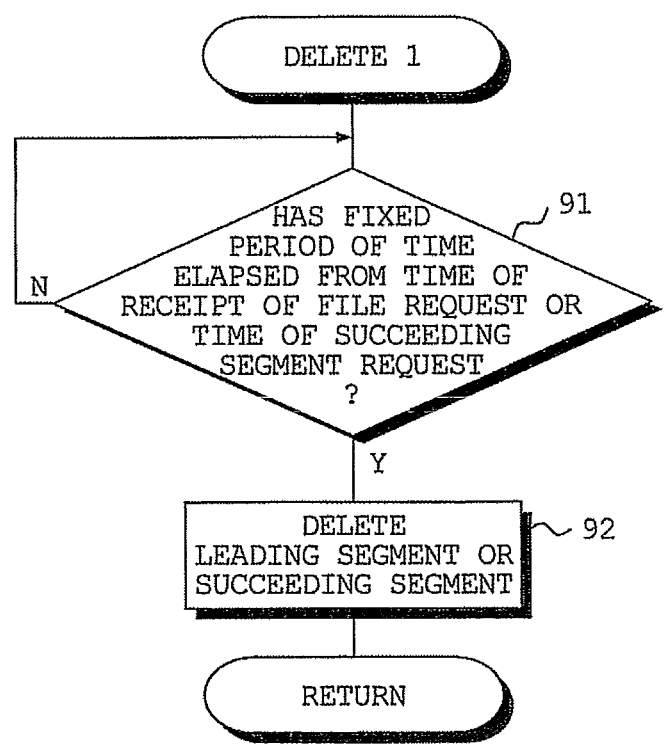
FIGS. 9 and 10 are flowcharts illustrating processing for deleting a succeeding segment.

FIG. 9 is a flowchart illustrating processing for deleting a leading segment or a succeeding segment.

A leading segment and a succeeding segment that have been converted in the manner described above are stored in the transmit moving picture database 6. However, it may be so arranged that these are deleted. Naturally, it may also be so arranged that the leading segment and the succeeding segment are not stored in the transmit moving picture database 6.

It is determined whether a fixed period of time (e.g., three days) has elapsed from the time at which a moving picture file was received or from the time at which a succeeding segment request was received (step 91). If the fixed period of time has elapsed, the leading segment or succeeding segment is deleted (step 92). Since at least one of the leading segment and succeeding segment is deleted, a decrease in available memory area of the transmit moving picture database 6 can be prevented.

The determination may be made depending upon whether the fixed period of time has elapsed from either one of the time at which a moving picture file was received or the time at which a succeeding segment request was received, or the determination may be made depending upon whether the fixed period of time has elapsed from both of these receipt times. If there is a moving picture file request, processing for converting the succeeding segment is executed and the result is stored in the transmit moving picture database 6. However, in a case where there is no succeeding segment request from the mobile telephone, the succeeding segment will not be deleted if deletion of the succeeding segment is performed based solely upon time at which a succeeding segment request was received. For this reason, it is preferred that the succeeding segment be deleted also in a case where the fixed period of time has elapsed from the timing at which the moving picture file request was received.

Figure 10:
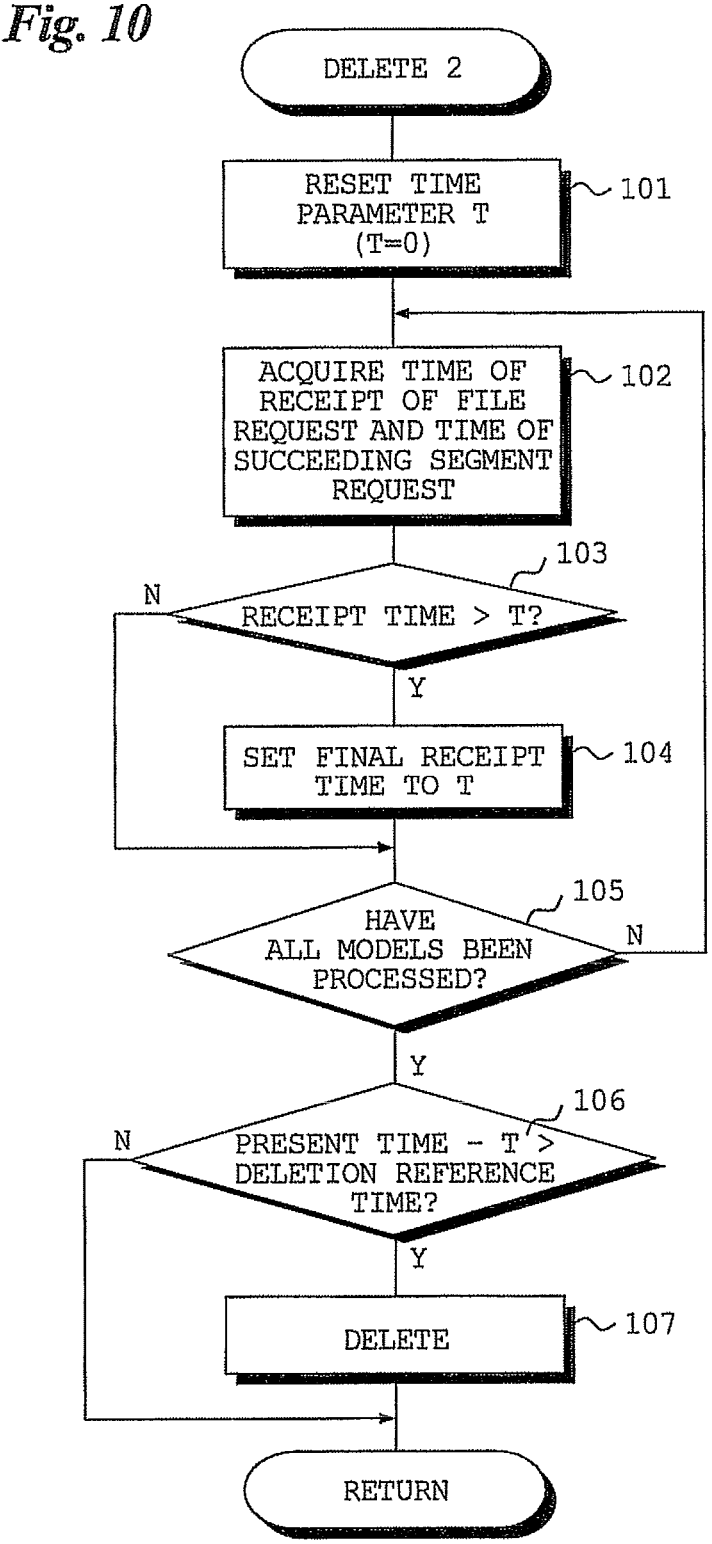

FIG. 10 is another flowchart illustrating processing for deleting a leading segment or a succeeding segment.

In the flowchart of FIG. 9, whether a fixed period of time has elapsed from the time at which a moving picture file request or succeeding segment request was received is determined with regard to a leading segment or succeeding segment corresponding to every mobile telephone company and mobile telephone model, and the leading segment or succeeding segment is deleted if the mobile telephone model, etc, is different, even if the original moving picture is the same. By contrast, in FIG. 10, if the original moving picture is the same, then, in a case where there is a request from a different model, etc., the time of receipt of a request for a succeeding segment is updated and whether the fixed period of time has elapsed is determined using the updated time as the reference.

First, a time parameter T is reset (T=0) (step 101). The time at which a moving picture file was received and the time at which a succeeding segment request of a specific mobile telephone model and mobile telephone company was received are acquired (step 102). If either of the acquired receipt times represents a time later than the time parameter T (receipt time>T) ("YES" at step 103), then the final receipt time of the acquired receipt times is set to the time parameter T (step 104).

The processing of steps 102 to 104 is executed for all mobile telephone companies and mobile telephone models regarding a specific moving picture (step 105).

If a time obtained by subtracting the time of the time parameter T from the present time exceeds a deletion reference time (e.g., three days) ("YES" at step 106), then all succeeding segments generated for each of the mobile telephone companies and mobile telephone models regarding the specific moving picture are deleted (step 107).

In the deletion processing shown in FIG. 9, if there is no request from a specific mobile telephone model and mobile telephone company, then the succeeding segment of the moving picture for this mobile telephone is deleted. However, with the processing shown in FIG. 10, if there is a request for a moving picture from another mobile telephone, the succeeding segment of this moving picture is not deleted, even if there is no request from the specific mobile telephone.

As many apparently widely different embodiments of the present invention can be made without departing from the spirit and scope thereof, it is to be understood that the invention is not limited to the specific embodiments thereof except as defined in the appended claims.

What is claimed is:

1. A system comprising:
   a moving picture file request receiving device for receiving a moving picture file request transmitted from a client terminal;
   a leading segment converting device for converting file format, number of pixels per frame, bit rate, frame rate and amount of data of a leading segment of a moving picture file, which segment represents the leading segment of the moving picture file specified by the moving picture file request, in such a manner that the leading segment can be reproduced by the client terminal that transmitted the moving picture file request and such that reproduction time thereof will be less than the time in which the moving picture file can be reproduced by the client terminal;
   a first transmitting device for transmitting the leading segment, which has been converted by said leading segment converting device, to the client terminal that transmitted the moving picture file request;
   a succeeding segment converting device for converting file format, number of pixels per frame, bit rate, frame rate and amount of data of a succeeding segment, which has a reproduction time less than that of the leading segment, during transmission of the leading segment by said first transmitting device, the succeeding segment being a segment that follows the leading segment transmitted by said first transmitting device;
   a succeeding segment request receiving device for receiving a request for the succeeding segment transmitted from the client terminal;
   a second transmitting device, responsive to receipt of the succeeding segment request, for transmitting the succeeding segment, which has been converted by said succeeding segment converting device, to the client terminal that transmitted the succeeding segment request; and
   a conversion control device for controlling said succeeding segment converting device in such a manner that the conversion by said succeeding segment converting device is repeated, wherein said conversion control device controls repeated conversion of next succeeding segments such that, upon the determination that a request for a second succeeding segment following a first succeeding segment is not received before conversion of the first succeeding segment ends, further conversion of the second succeeding segment is not performed;
   wherein in response to receipt of the succeeding segment request at said succeeding segment receiving device where conversion of the succeeding segment by said succeeding segment converting device has not ended, a completed portion of the succeeding segment in the succeeding segment converting device is transmitted to the client terminal.

2. A method comprising:
   receiving a moving picture file request transmitted from a client terminal;
   converting file format, number of pixels per frame, bit rate, frame rate and amount of data of a leading segment of a moving picture file in such a manner that the leading segment can be reproduced by the client terminal such that reproduction time thereof will be less than the time in which the moving picture file can be reproduced by the client terminal;
   transmitting the converted leading segment to the client terminal;
   converting file format, number of pixels per frame, bit rate, frame rate and amount of data of a succeeding segment, which has a reproduction time less than that of the leading segment, during transmission of the leading segment, the succeeding segment being a segment that follows the leading segment that has been transmitted;
   receiving a request for the succeeding segment transmitted from the client terminal;
   responsive to receipt of the succeeding segment request, transmitting the converted succeeding segment to the client terminal; and
   selectively repeating conversion of next succeeding segments that follow the succeeding segment; and
   controlling repeated conversion of the next succeeding segments such that, upon the determination that a request for a second succeeding segment following a first succeeding segment is not received before conversion of the first succeeding segment ends, further conversion of the second succeeding segment is not performed;
   wherein in response to receipt of the succeeding segment request where conversion of the succeeding segment has not ended, a completed portion of the succeeding segment is transmitted to the client terminal.

3. The system according to claim 1, wherein the system includes a server.

4. The system according to claim 1, further comprising a terminal specifications acquisition unit configured to identify a carrier and a model of the client terminal.

5. The system according to claim 1, further comprising a database control unit configured to determine whether the moving picture file is stored in the system before conversion of the leading segment and the succeeding segment.

6. The system according to claim 1, wherein the leading segment converting device and the succeeding segment converting device are different.

7. The system according to claim 1, wherein the first transmitting device and the second transmitting device are different.

8. The system according to claim 1, wherein the client terminal is a mobile phone.

9. The method of claim 2, further comprising identifying a carrier and a model of the client terminal.

10. The method of claim 2, further comprising determining whether the moving picture file is stored in the system before conversion of the leading segment and the succeeding segment.

11. A tangible non-transitory computer-storage medium storing computer-executable instructions that, when executed, cause a computer system to perform a computer-implemented method comprising:
   receiving a moving picture file request transmitted from a client terminal;
   converting a leading segment of a moving picture file in such a manner that the leading segment can be reproduced by the client terminal such that reproduction time thereof will be less than the time in which the moving picture file can be reproduced by the client terminal;

transmitting the converted leading segment to the client terminal; converting a succeeding segment, which has a reproduction time less than that of the leading segment, during transmission of the leading segment, the succeeding segment being a segment that follows the leading segment that has been transmitted;

receiving a request for the succeeding segment transmitted from the client terminal;

responsive to receipt of the succeeding segment request, transmitting the converted succeeding segment to the client terminal;

selectively repeating conversion of next succeeding segments that follow the succeeding segment; and controlling repeated conversion of the next succeeding segments such that, upon the determination that a request for a second succeeding segment following a first succeeding segment is not received before conversion of the first succeeding segment ends, further conversion of the second succeeding segment is not performed;

wherein in response to receipt of the succeeding segment request where conversion of the succeeding segment has not ended, a completed portion of the succeeding segment is transmitted to the client terminal.

12. The tangible computer-storage medium of claim 11, further comprising determining whether the moving picture file is stored in the system before conversion of the leading segment and the succeeding segment.

13. The tangible computer-storage medium of claim 11, wherein the client terminal is a mobile phone.

* * * * *